G. G. Park.
Hay Loader.
No. 106611. Patented Aug. 23, 1870.
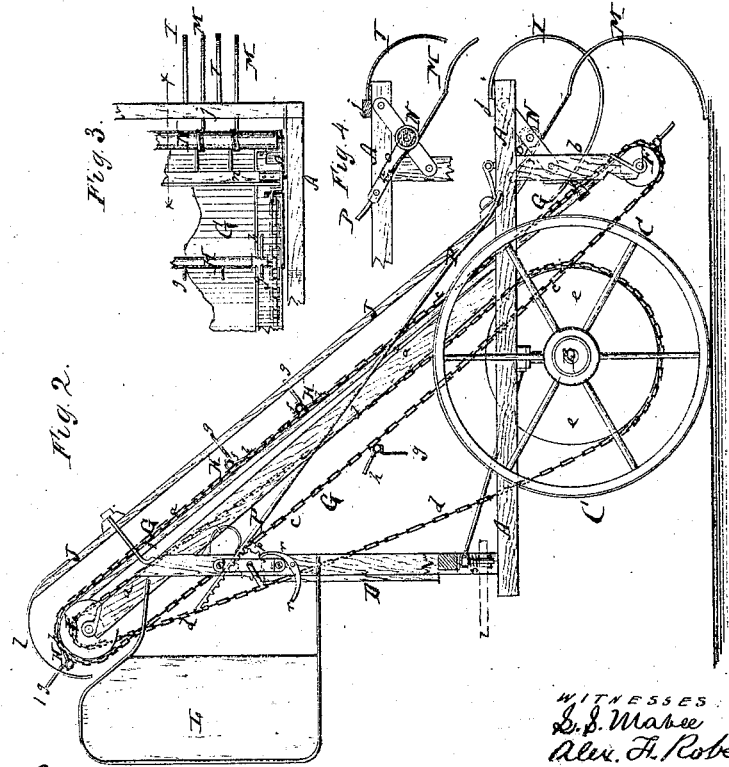
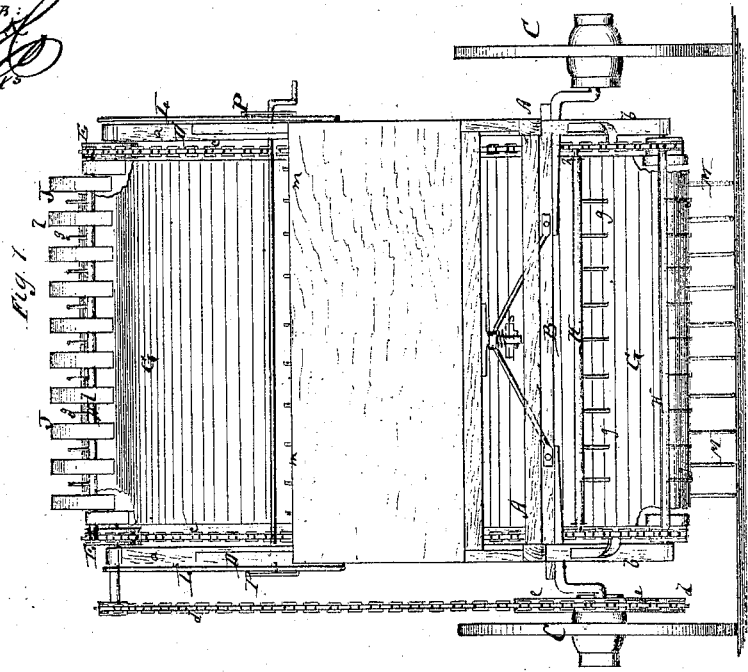

UNITED STATES PATENT OFFICE.

GILBERT G. PARK, OF XENIA, NEBRASKA.

IMPROVEMENT IN HAY-LOADERS.

Specification forming part of Letters Patent No. 106,611, dated August 23, 1870.

*To all whom it may concern:*

Be it known that I, GILBERT G. PARK, of Xenia, in the county of Sarpy and State of Nebraska, have invented a new and Improved Hay Raker and Loader; and I do hereby declare that the following is a full, clear, and exact description thereof, which will enable others skilled in the art to make and use the same, reference being had to the accompanying drawing, forming part of this specification.

Figure 1 represents a front elevation of my improved hay raker and loader. Fig. 2 is a side elevation, partly in section, of the same. Fig. 3 is a detail plan view of the rear portion of the same. Fig. 4 is a detail vertical section of the same, taken on the plane of the line $x\ x$, Fig. 3.

Similar letters of reference indicate corresponding parts.

My invention relates to hay-loaders; and consists in certain improvements, which will be first described in connection with all that is necessary to a full understanding thereof, and then clearly specified in summary or claim.

A in the drawing represents the frame of the hay raker and loader. It is supported in the middle by the axle B of two wheels, C C, the said wheels turning loose on the axle. The frame is thus balanced on the axle, projecting equally far forward and backward of the same. The frame A is horizontal. From its front part projects an upright frame, D, braced by inclined bars $a\ a$, as shown.

In the upper part of the frame D is hung a transverse shaft or drum, E. A similar shaft or drum, F, is hung in arms $b$, that are suspended from the rear part of the frame A. An endless apron, G, is placed over the drums E F and contains the elevating devices. The edges of the apron are lined with chains $c$, which fit over teeth on the drums E F, to be evenly carried along by the same. A belt or chain, $d$, passing over a pulley, $e$, on a wheel, C, and over the drum E, imparts rotary motion to the latter and to the apron while the machine is in motion.

To ears $f\ f$, that project from the chain $c$, are pivoted transverse bars H H, at suitable distances apart. The bars H contain the elevating-teeth $g\ g$, which carry the hay from the ground to the upper part of the frame D.

Each bar H has near each end a projecting pin, $h$, which slides upon an inclined track, $i$, of the frame D on the ascending side of the apron, so as to hold the teeth $g$ upright for elevating the hay. At the top end of the frame D the rail $i$ ceases, and the teeth $g$ drop, as indicated in Fig. 2, to discharge the hay. The hay which is taken up from the rake by the teeth $g$ of the bar H is, as the apron revolves, gradually carried up. A series of spring-wires, I I, which project backward, downward, and then forward from the rear cross-bar, $j$, of the frame A, so as to rest with their ends upon the apron, serve to press the hay upon the apron, besides clearing the rake-teeth, as hereinafter more fully specified.

The ascending side of the apron is covered by a fixed lattice-frame, J, which serves to hold the hay upon the apron and prevents the wind from carrying it off. The ends of the laths are formed by curved springs $l$, that fit over the drum F, as shown. These springs yield to an accumulation of hay at the discharge end. In front of the frame D are secured at the sides projecting shields L L, of canvas, sheet metal, or other material. They prevent the wind from blowing away the hay as the same drops from the elevator upon the wagon. The descending part of the apron passes close above a toothed edge of a front cross-bar, $m$, of the frame D. The teeth on $m$ prevent any hay from being carried down again by the teeth $g$.

The teeth M M are ogee-shaped, and are secured to a head, N, that is pivoted in the rear part of the frame A. They are coiled around the head, and have their ends secured to another cross-bar, $n$, which is hung in arms $o$, that project from the pivoted head. The same arms $o$ are connected with levers P, which extend forward, as shown. The front edges of the lever P are toothed, and mesh into pinions $p$, that are hung in the sides of the frame D. Pawls $r$ serve to lock the pinions, levers, and rake-teeth in any desired position, permitting, however, their adjustment. The clearers I fit between the rake-teeth and prevent the hay from accumulating between the same.

The connection with the draft in front is made by a vertical bolt, $s$, which carries a spiral spring, as shown, so that the front end of the machine has thus an elastic support to cause the apparatus to move smoothly over uneven ground.

By being balanced on the axle B the whole apparatus will not affect the rake-teeth by its weight, nor will it tend to elevate them from the ground.

Having thus described my invention, I claim as new and desire to secure by Letters Patent—

1. The combination of the curved springs $l$ with shield L and toothed cross-bar $m$, all relatively arranged as shown and described, and for the purpose specified.

2. The arrangement in the upright frame D, and over the front of horizontal frame A, of a vertical spring-bolt, S, as and for the purpose specified.

GILBERT G. PARK.

Witnesses:
C. K. PRESTON,
JAMES R. KENNEDY.